(12) United States Patent
Siercks

(10) Patent No.: US 9,628,779 B2
(45) Date of Patent: Apr. 18, 2017

(54) OPTICAL MEASUREMENT METHOD AND MEASUREMENT SYSTEM FOR DETERMINING 3D COORDINATES ON A MEASUREMENT OBJECT SURFACE

(75) Inventor: Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 664 days.

(21) Appl. No.: 14/004,880

(22) PCT Filed: May 16, 2012

(86) PCT No.: PCT/EP2012/059120
§ 371 (c)(1),
(2), (4) Date: Sep. 12, 2013

(87) PCT Pub. No.: WO2012/156448
PCT Pub. Date: Nov. 22, 2012

(65) Prior Publication Data
US 2014/0063204 A1    Mar. 6, 2014

(30) Foreign Application Priority Data
May 19, 2011   (EP) .................................. 11166780

(51) Int. Cl.
*G06T 7/521*   (2017.01)
*H04N 13/02*   (2006.01)
*G01B 11/25*   (2006.01)

(52) U.S. Cl.
CPC ..... *H04N 13/0253* (2013.01); *G01B 11/2545* (2013.01); *G06T 7/521* (2017.01);
(Continued)

(58) Field of Classification Search
None
See application file for complete search history.

(56) References Cited

U.S. PATENT DOCUMENTS 5,175,601 A * 12/1992 Fitts .................... G01B 11/2513
250/237 G
5,870,136 A *  2/1999 Fuchs ....................... G01S 5/16
348/169

(Continued)

FOREIGN PATENT DOCUMENTS

CN     1163661 A     10/1997
CN   101093581 A     12/2007

(Continued)

OTHER PUBLICATIONS

European Search Report dated Oct. 21, 2011 as received in Application No. EP 11 16 6780.

*Primary Examiner* — Tsung-Yin Tsai
(74) *Attorney, Agent, or Firm* — Maschoff Brennan

(57) ABSTRACT

An optical measurement method for determining 3D coordinates of a plurality of measurement points on a measurement object surface. The measurement object surface is illuminated with a pattern sequence of different patterns by a projector, an image sequence of the measurement object surface illuminated with the pattern sequence is recorded with a camera system, and the 3D coordinates of the measurement points are determined by evaluating the image sequence, in particular wherein a succession of brightness values for identical measurement points on the measurement object surface is ascertained in respective images of the recorded image sequence. Translational and/or rotational accelerations of the projector, of the camera system and/or of the measurement object are measured here and, in dependence on the measured accelerations, the illumination of the measurement object surface and/or the recording of the image sequence is/are reactively adapted, in particular temporally substantially directly and live during the measurement process.

26 Claims, 8 Drawing Sheets

(52) U.S. Cl.
CPC ............... *G06T 2207/10152* (2013.01); *G06T 2207/30164* (2013.01)

(56) References Cited

U.S. PATENT DOCUMENTS

| | | | |
|---|---|---|---|
| 6,104,840 A * | 8/2000 | Ejiri | G06T 17/00 382/284 |
| 6,128,086 A * | 10/2000 | Fowler | G01B 11/08 250/342 |
| 6,369,899 B1 * | 4/2002 | Hamada | H04N 5/2354 348/E5.038 |
| 6,438,272 B1 * | 8/2002 | Huang | G01B 11/2527 356/4.09 |
| 6,709,116 B1 | 3/2004 | Raskar et al. | |
| 6,748,124 B1 * | 6/2004 | Nishiyama | G06T 7/0004 382/149 |
| 6,754,370 B1 * | 6/2004 | Hall-Holt | G01B 11/25 356/3 |
| 7,578,522 B2 * | 8/2009 | Hanano | B60R 21/2644 102/531 |
| 8,243,286 B2 | 8/2012 | Palme et al. | |
| 8,477,995 B2 | 7/2013 | Porter et al. | |
| 8,989,518 B2 | 3/2015 | Aratani et al. | |
| 2002/0041282 A1 * | 4/2002 | Kitaguchi | G06T 7/55 345/418 |
| 2005/0237581 A1 | 10/2005 | Knighton et al. | |
| 2005/0237583 A1 | 10/2005 | Chang et al. | |
| 2007/0177159 A1 * | 8/2007 | Kim | G01B 11/2531 356/601 |
| 2010/0008543 A1 * | 1/2010 | Yamada | G06T 7/521 382/106 |
| 2010/0046005 A1 * | 2/2010 | Kalkowski | G01C 11/06 356/604 |
| 2010/0245851 A1 * | 9/2010 | Teodorescu | G01B 11/2509 356/625 |
| 2010/0303341 A1 * | 12/2010 | Hausler | A61B 5/0062 382/154 |
| 2010/0328484 A1 * | 12/2010 | Yamada | G01B 11/25 348/222.1 |
| 2011/0164114 A1 * | 7/2011 | Kobayashi | H04N 13/0253 348/46 |
| 2012/0133742 A1 | 5/2012 | Ertl | |
| 2014/0132734 A1 * | 5/2014 | Zhuang | H04N 13/0253 348/47 |

FOREIGN PATENT DOCUMENTS

| | | |
|---|---|---|
| CN | 102196242 A | 9/2011 |
| DE | 196 33 686 A1 | 2/1998 |
| DE | 101 27 304 A1 | 12/2002 |
| DE | 10 2008 036 710 A1 | 2/2010 |
| DE | 10 2009 026 248 A1 | 1/2011 |
| EP | 2400261 A1 | 12/2011 |
| GB | 2 292 605 A | 2/1996 |
| JP | H10-510352 A | 10/1998 |
| JP | 2000-099702 A | 4/2000 |
| JP | 2005-069771 A | 3/2005 |
| JP | 2010-193458 A | 9/2010 |
| JP | 2011-232104 A | 11/2011 |
| JP | 2012-122893 A | 6/2012 |
| WO | 96/06325 A1 | 2/1996 |
| WO | 2008/046663 A2 | 4/2008 |
| WO | 2010/145669 A1 | 12/2010 |

* cited by examiner

Current dynamic level: low

Adaptation of the pattern order in such a way that the relatively finely structured patterns of the pattern sequence are currently projected Current dynamic level: high Adaptation of the pattern order in such a way that the relatively coarsely structured patterns of the pattern sequence are currently projected

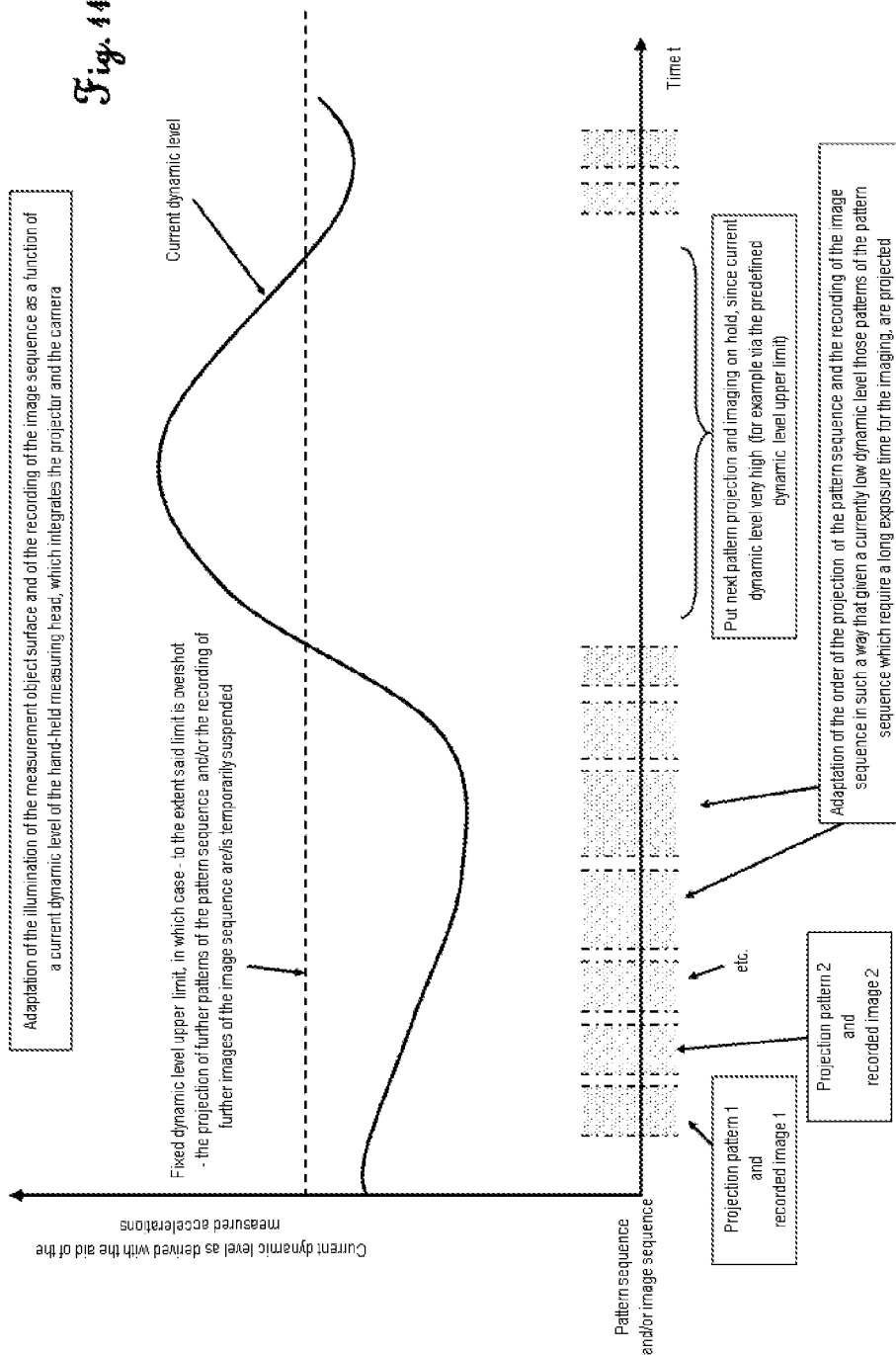

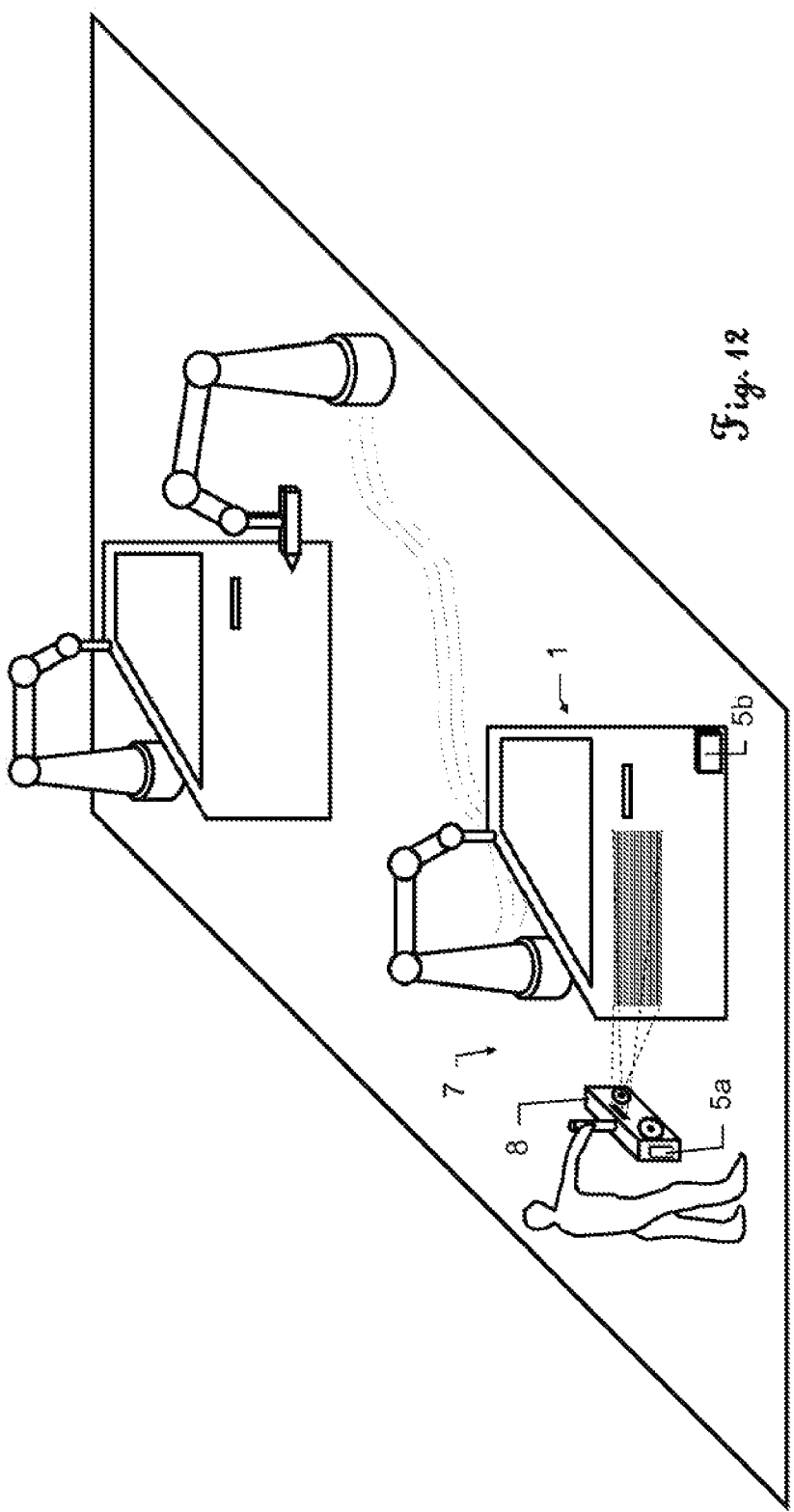

OPTICAL MEASUREMENT METHOD AND MEASUREMENT SYSTEM FOR DETERMINING 3D COORDINATES ON A MEASUREMENT OBJECT SURFACE

FIELD OF THE INVENTION

The invention relates to an optical measurement method for determining 3D coordinates of a multiplicity of measurement points of a measurement object surface, and to a measurement system, designed for the same purpose.

BACKGROUND

Such devices and methods are used, in particular, in mechanical engineering, automotive engineering, the ceramics industry, the shoe industry, the jewelry industry, dental technology and human medicine (orthopedics) and further areas, and are, for example, employed in measurement and recording for quality control, reverse engineering, rapid prototyping, rapid milling or digital mockup.

The increasing demands for substantially complete quality control during the production process, and for the digitization of the spatial form of prototypes renders the recording of surface topographies an ever more frequently occurring measurement task. The task arises in this case of determining the coordinates of individual points of the surface of the objects to be measured in a short time.

Measurement systems known from the prior art which use image sequences and serve to determine 3D coordinates of measurement objects which can, for example, be designed as portable, hand-held and/or permanently installed systems in this case generally have a pattern projector for illuminating the measurement object with a pattern, and are therefore also sometimes referred to as pattern-projecting 3D scanners or light structures 3D scanners. The pattern projected onto the surface of the measurement object is recorded by a camera system as a further component of the measurement system.

During a measurement, the projector thus illuminates the measurement object sequentially in time with different patterns (for example parallel light and dark stripes of different widths, in particular the stripe pattern can also, for example, be rotated by 90°, for example). The camera(s) register(s) the projected stripe pattern at a known angle of view to the projection. An image is recorded with each camera for each projection pattern. A temporal sequence of different brightness values thus results for each pixel of all the cameras.

However, apart from stripes, it is also possible in this case to project other appropriate patterns such as, for example, random patterns, pseudo codes, etc. Patterns suitable for this are sufficiently known to the person skilled in the art from the state of the art. By way of example, pseudo codes enable an easier absolute assignment of object points, something which is becoming increasingly more difficult when projecting very fine stripes. Thus, for this purpose, it is possible either to project in rapid succession firstly one or more pseudo codes followed by a fine stripe pattern, or else to project in consecutive recordings, different stripe patterns which become finer in the sequence, until the desired accuracy is achieved in the resolution of measurement points on the measurement object surface.

The 3D coordinates of the measurement object surface can then be calculated from the recorded image sequence by means of image processing from the photogrammetry and/or stripe projection by using methods known to the person skilled in the art in this field. For example, such measurement methods and measurement systems are described in WO 2008/046663, DE 101 27 304 A1, DE 196 33 686 A1, or DE 10 2008 036 710 A1.

The camera system usually comprises one or more digital cameras, which are located relative to one another during a measurement in a known spatial position. In order to ensure a stable position of the cameras relative to one another, they are mostly integrated together in a common housing in a fixed fashion with known spatial positioning and alignment, in particular the cameras being aligned in such a way that the fields of view of the individual cameras for the most part overlap. Two or three cameras are often used in this case. Here, the projector can be permanently connected to the camera system (in the case of the use of separate cameras, also only to some of the cameras present in the camera system), or else be positioned completely separate from the camera system.

The desired three-dimensional coordinates of the surface are calculated in two steps in the general case, that is to say in the case when the relative positioning and alignment of the projector relative to the camera system is fixed relative to one another and therefore not already known in advance. In a first step, the coordinates of the projector are then determined as follows. The image coordinates in the camera image are known relative to a given object point. The projector corresponds to a reversed camera. The sequence of brightness values that have been measured from the image sequence for each camera pixel can be used to calculate the number of the stripe. In the simplest case, this is done via a binary code (for example a Gray code) which marks the number of the stripe as a discrete coordinate in the projector. A higher accuracy can be achieved with the so-called phase shift method, since it can determine a nondiscrete coordinate. It can be used either as a supplement of a Gray code or as an absolute-measuring heterodyne method.

Once the projector position has been determined in this way, or given that said position is already known in advance relative to the camera system, 3D coordinates of measurements points on the measurement object surface can be determined as follows—for example using the method of forward section. The stripe number in the projector corresponds to the image coordinate in the camera. The stripe number specifies a light plane in space, the image coordinate specifies a light beam. Given a known camera and projector position, it is possible to calculate the point of intersection of the plane and the straight line. This is the desired three-dimensional coordinate of the object point in the coordinate system of the sensor. The geometric position of all the image beams must be known exactly. The exact calculation of the beams is performed with the forward section known from photogrammetry.

In order to achieve higher accuracies in this measurement method for calculating the 3D coordinates, the non-ideal properties of real lens systems, which result in distortions of the image, can be adapted by a distortion correction and/or a precise calibration of the imaging properties can be performed. All the imaging properties of the projector and cameras can in this case be measured during calibration processes known to the person skilled in the art (for example a series of calibration images), from which it is possible to create a mathematical model for describing these imaging properties (for example the parameters designating the imaging properties are determined from the series of calibration images by using photogrammetric methods—in particular a bundle adjustment calculation).

In summary, it follows that in the case of the pattern projection method or the light structures 3D scanner it is necessary to illuminate the object with a sequence of light patterns in order to enable a unique determination of the depth of the measurement points in the measurement area with the aid of triangulation (forward section). Thus, in order to ensure a sufficiently high degree of accuracy with reference to the measurement result, there is mostly a need for a plurality of images (that is to say a series of images) accompanied by illumination of the measurement object with appropriate different pattern projections (that is to say with an appropriate series of patterns). In the case of hand-held systems known from the state of the art, such as, for example, the measurement device described in WO 2008/046663), the illumination sequence must take place here so quickly that a movement by the operator during the recording of the series of images does not lead to measurement errors. It must be possible for the pixels of the respective projection that are recorded by the cameras to be satisfactorily assigned to one another. Thus, the image sequence must be faster than the pattern shift or image shift caused by the operator. Since the emittable optical energy of the projector is limited by the available optical sources and by radiation protection calculations, this leads to a limitation of the detectable energy in the camera system and thus to a limitation of the measurement on the weakly reflecting measurement object surfaces. Furthermore, the projectors have a limited projection speed (frame rate). Usual maximum frame rates of such projectors are, for example, around 60 Hz.

By way of example, conventional measurement devices require a measurement period of approximately 200 ms for a measurement process involving projection of a series of patterns and recording of an image sequence of the respective patterns with the camera system (as an example: given an exposure time of 20 ms to 40 ms per image, the recording of sequences of 8 to 10 images can result in, for example, total recording times or measurement periods of between 160 ms and 400 ms per measurement position).

Various undesired effects which hinder, complicate or even frustrate the evaluation, or at least negatively influence the achievable accuracy can therefore result when the camera arrangement, the projector (and/or, if appropriate, a measuring head in which the camera arrangement and the projector are integrated) and the measurement object are not held relative to one another during a measurement process (in a measurement position) with adequate steadiness and/or with an adequately high retention of position and alignment.

Different causes may come into question for inadequate steadiness of the camera arrangement, of the projector (and/or, if appropriate, a measuring head in which the camera arrangement and the projector are integrated), or of the measurement object.

Firstly, vibrations in the measurement environment can (for example if the measurements are carried out at a production station integrated in a production line) be transmitted to the holder of the measurement object or else to a robot arm holding the measuring head, and thus lead to interfering vibrations. Consequently, there has been a need to date for complicated measures for vibration damping, or for removal to special measurement facilities, but this greatly complicates the production process (since the measurement object has to be removed from the production line and transported into the measurement facility configured appropriately therefor).

With hand-held systems, the main cause of not being held adequately steadily is, in particular, the natural tremor in the hand of the human user.

Mention may be made—on the one hand—of motion blur and/or fuzziness in individual recorded images of an image sequence as negative effects which can be caused by inadequate ability to hold the position and alignment of the camera arrangement, the projector and the measurement object relative to one another.

On the other hand, however, it can also occur that the individual images of an image sequence do not conform to one another with reference to their respective recording positions and directions relative to the measurement object (that is to say fluctuations in the recording positions and directions of the individual images in an image sequence), with the result that respective assignment of pixels in the individual images to identical measurement points on the measurement object surface is either completely frustrated or can be enabled only by an enormously high computation outlay and incorporation of information from a multiplicity of images of the same area of the measurement object surface (that is to say there can be a need for the individual images to be spatially related by subsequent calculation that is very costly, for which reason an excess of images per image sequence have in part so far been recorded to prevent this effect, their main purpose being merely a back calculation of the spatial reference of the recording position and directions of the individual images relative one to another).

In order to extend the measurement range on the measurement object (for example to measure an object in its entirety), there is often a need for a plurality of measurements one after another (from various measurement positions and various angles of view of the camera relative to the measurement object), the results of the various measurements subsequently being stitched to one another. This can be done, for example, by selecting the acquisition areas to overlap in each case for the respective measurement processes, and using the respective overlap for the appropriate combining of the 3D coordinates (that is to say point clouds) obtained for a plurality of measurement processes (that is to say, identical or similar distributions can be identified in the point clouds determined for the individual measurement processes, and the point clouds can be joined accordingly).

However, this combining process is generally extremely computationally intensive, and even with the availability of the highest processor performances, still requires a high outlay of time and energy that is not to be underestimated and is inconvenient. For example, when using a robot arm to hold and guide the measuring head it is, for example, possible thereby to achieve a reduction in the computation outlay required for the combining process by acquiring the recording positions and directions for the individual measurements with the aid of the respective robot arm position and using these for the combination as prior information (for example as boundary conditions).

Disadvantages in this case are the relatively low degree of accuracy with which the measurement position can be determined with the aid of the robot arm position and—nevertheless—the requirement for the presence of such a robot arm. Thus, the computing power necessary for combining measurement results of a plurality of measurement processes cannot be reduced in this way for hand-held measurement systems.

Further disadvantages of systems of the state of the art which use substantially coherent optical radiation for pattern illumination are local measurement inaccuracies or measurement point gaps caused by speckle fields which occur in an undesirable fashion in the respective patterns of the pattern sequence.

The European patent application having application number 10166672.5 describes in this connection a pattern projection method or a light structures 3D scanner, there being provided at the projector, at the camera system and/or at the measurement object, inertial sensors for measuring translational and rotational accelerations of the projector, of the camera system and/or of the measurement object during recording of the image sequence. These measured accelerations measured by means of the IMU are then taken into account in the computational determination of the 3D coordinates from the recorded image sequence such that movements occurring during the recording of the image sequence (which can, for example, be caused by a lack of steadiness of the measuring head in which the camera arrangement and the projector are integrated) can be compensated computationally for the determination of the 3D coordinates.

SUMMARY

Proceeding from the above-named disadvantages of the state of the art, the technical object on which the invention is based is therefore to provide an improved optical measurement method which uses image sequences and measurement systems for determining 3D coordinates on a measurement object surface, in particular it being possible to reduce or eliminate one or more of the above-described disadvantages.

More specific objects of the invention in this case are to enable a more precise determination of 3D coordinates, even for measurement systems known from the state of the art which are unable adequately to maintain the position of the projector, of the camera system and/or of the measurement object (for example owing to undesired oscillations, vibrations or instances of unsteady holding) during the measurement process (that is to say during the projection of pattern sequences and the recording of image sequences). Specifically, the aim here is—on the one hand—to be able to be reduce errors or inaccuracies in the determination of the 3D coordinates which are to be ascribed to fuzziness and/or motion blur in the individual images of an image sequences. On the other hand, the aim is also to be able to reduce or eliminate errors which are to be ascribed to fluctuations, occurring in the case of unsteadiness, in the recording position and direction among the images of an image sequence.

A further specific object—in particular when use is made of a handheld measurement system—is a simplified guidance for users when carrying out a measurement, the aim being, in particular, to reduce the risk of inadvertently completely omitting subareas of the surface to be measured from the measurement or of recording superfluously many, redundant images of such a subarea.

These objects are achieved by implementing the characterizing features of the independent claims. Features which develop the invention in an alternative or advantageous way are to be gathered from the dependent patent claims.

The invention relates to an optical measurement method for determining 3D coordinates of a multiplicity of measurement points of a measurement object surface.

For this purpose, the measurement object surface is illuminated with a pattern sequence of different patterns by a projector, an image sequence of the measurement object surface illuminated with the pattern sequence is recorded with a camera system, and the 3D coordinates of the measurement points are determined by evaluating the image sequence, in particular there being determined a sequence of brightness values for identical measurement points of the measurement object surface in respective images of the recorded image sequence.

According to the invention, translational and/or rotational accelerations of the projector, of the camera system and/or of the measurement object are measured, and the illumination of the measurement object surface and/or the recording of the image sequence are/is reactively adapted, in particular substantially immediately and live during the measurement process in terms of time, as a function of the measured accelerations.

Thus, in accordance with a basic idea of the invention, movements of the projector, of the camera system and/or of the measurement object (in particular slight movements that occur undesirably and/or are unavoidable), occurring during the measurements are measured in particular using an IMU (Inertial Measuring Unit) and used to exert immediate direct influence on the current measurement process. That is to say, the reaction to a determination of movements (caused, for example, by the natural tremor of the user's hand) of components of the measurement system is temporally direct and live, and the currently running measurement process is adapted immediately in such a way that the influence of the movements on the measurement result is kept as slight as possible and yet it is possible in this case to optimize the measurement process with regard to efficient conduct. The reaction to measured movements, which is performed immediately and live in temporal terms, is intended in this case to be understood to mean that any time delay between detection of the movements and active implementation of an adaptation of the running measurement process is substantially determined only by the computing time required by an electronic evaluation unit to derive a corresponding measurement process parameter adaptation.

Some examples of to what extent, which and/or which type of, measurement process parameters of the currently running measurement process can be adapted live as a function of the acquired accelerations, and how it is possible specifically or in which way to measure/acquire the accelerations are explained in more detail below.

In accordance with a specific aspect of the invention, in this case the accelerations of the projector, of the camera system and/or of the measurement object can be measured in all six degrees of freedom, and the measurement of the accelerations can be performed continuously at a specific measurement rate, in particular of between approximately 1 and 2000 Hz, specifically between approximately 50 and 2000 Hz, at least during the exposure times of the individual images of the image sequence, in particular during the entire process of illuminating the measurement object surface and recording the image sequence or plurality of image sequences.

In accordance with a further aspect of the invention, as a function of a current dynamic level of the projector, of the camera system and/or of the measurement object derived—during the illumination with the aid of the measured accelerations—the pattern sequence can be adapted—substantially immediately reactively in terms of time to the derivation of the respective current dynamic level, specifically wherein an order of different patterns of the pattern sequence that are to be projected consecutively is adapted, specifically in such a way that those patterns of the pattern sequence with a relatively low degree of fineness are projected given a relatively high current dynamic level, and those patterns of the pattern sequence with a relatively high degree of fineness are projected given a relatively low current dynamic level, and/or a brightness (that is to say light intensity of the optical radiation emitted to illuminate the projector) is adapted for the individual patterns to be projected, and/or a projection period of the individual patterns to be projected is adapted (for example putting projection of the next pattern on hold in the case of currently strong movements [currently high dynamic level]), and/or projection instants of the individual patterns to be projected are adapted, and/or a degree of fineness and/or of structuring of the individual patterns to be projected are/is adapted, and/or an individual pattern of the pattern sequence is adapted in such a way during the projection of said pattern that the illumination structure thereby produced on the measurement object surface (1s) is held in a stable position on the measurement object surface (1s)—at least during the exposure time of the image of the image sequence provided for acquiring the measurement object surface (1s) illuminated with this pattern, and/or an area coverage and/or size of the individual patterns to be projected are/is adapted, →"the area coverage" being understood in this case as: density of the projection so that, for example, given a high dynamic level a pattern with lower density but with higher light intensity is projected→therefore shorter projection and exposure periods are possible while nevertheless eye protection regulations are met);

→"the size" being understood in this case as: the area enclosed by the boundaries of a pattern [for example, projecting with a smaller divergent angle or, for example, simply projecting only half of the actual pattern (in a simple case, for example, by a partially obscuring diaphragm)]

and/or a wavelength of the optical radiation used for the illumination for the individual patterns to be projected is adapted.

According to a further aspect of the invention, as a function of a current dynamic level of the projector, of the camera system and/or of the measurement object derived—during the acceleration with the aid of the measured accelerations—the image sequence can be adapted—substantially immediately reactively in terms of time to the derivation of the respective current dynamic level—specifically wherein a respective degree of granulation for the individual images to be recorded is adapted, and/or a respective exposure time for the individual images to be recorded is adapted, and/or recording instants of the individual images to be recorded are adapted, and/or a respective acquisition area for the individual images to be recorded is adapted, and/or a respective aperture width for the individual images to be recorded is adapted.

In summary, therefore, the projected pattern and/or imaging parameter can be dynamically adapted to the measurement object, in particular when the spatial position of the measurement object is roughly known and a (desired) CAD model of the measurement object is input into the measurement system. The determination of the position of the measurement object relative to the measurement system can firstly be performed roughly with the aid of the first measurement results. The measurement pattern can then be calculated in real time such that the desired resolutions at positions determined before the measurement are achieved during the measurement. The required measurement patterns can also be calculated before the measurement and stored in the measurement system. This procedure could minimize the computing power required in the measurement system.

In accordance with a further aspect of the invention, as a function of the measured accelerations, specifically as a function of current positions and orientations, derived from said accelerations, of the projector, of the camera system and/or of the measurement object (as well as, in particular, additionally as a function of at least roughly known or previously at least roughly determined 3D coordinates of the measurement object surface), current measurement progress and/or measurement process adaptation parameters can also be derived. Said parameters can then be projected onto the measurement object surface to guide the user and optimize the measurement process, for example the following information being projected as the measurement progress and/or measurement process adaptation parameters:

a measurement direction in which the projector and/or the camera system are/is to be aligned during the further measurement process, and/or a measurement position which are to be adopted by the projector and/or the camera system during the further measurement process and/or holding periods during which the projector and/or the camera system are/is to be held as steadily as possible in an invariable measurement direction and measuring position, and/or a current dynamic level, derived with the aid of the measured accelerations, of the projector, of the camera system and/or of the measurement object, specifically it being specified whether a predefined dynamic level upper limit is currently maintained or not.

In summary, therefore, the position and orientation values derived with the aid of the IMU-measured accelerations can be used to determine the relative spatial reference between individual measurements (with a relatively high measurement rate, such as, for example, between 50 and 2000 Hz) and to enable the stitching of the measurements in all six degrees of freedom. With the aid of these position values, the projector can be used—in the visible spectral region—to project onto the measurement object additional information which is to be provided to the user during or between measurements ("guidance"). The position on the object surface of the information to be projected is calculated in real time in this case with the aid of the IMU position values.

By way of example, it is possible to indicate on the measurement object areas where the measurement system is unable to record any measured values on the basis of the current alignment. This can occur, for example, owing to unfavorable reflection properties of the measurement object surface. According to the state of the art, such surfaces must be treated. This can be performed by roughening or by sprinkling with a powder. These measures lead to the spatially wider backscatter, thus to a lower dependence of the measurement results on the project and detection angle relative to the measurement object surface. The powder has a thickness that is not uniquely defined, and can therefore impair the accuracy of the measurement results, or interfere in the further processing.

In order to completely acquire the object surface without such aids, the object must be recorded from various perspectives and the recordings must be stitched to one another. For this purpose, according to the invention, the user can be guided in optimized fashion with the aid of the projected additional information. In addition to the display of surface regions incapable of measurement, it is likewise possible to project the movement direction relative to the time-optimized scanning of the measurement object, by means of arrows or comparable direction signals ("guidance").

For example:
the additional information for the user can be projected between the measurements, and/or
the additional information for the user can be superposed on the projected pattern.

The additional information can in this case be separated spectrally from the measurement pattern, or can also be included in the projected measurement pattern.

Some of the projected additional information presupposes a CAD model of the measurement object and its position relative to the projector. The position of the measurement object can, for example, be roughly determined in this case from the first measurements (for example, with the aid of measurable reference marks on the object or of measurement values at least roughly obtained from the "match" between the CAD model and first measurements).

The determination of position and orientation in this case permits not only user guidance and as to where and from which perspective it is still necessary to measure, but also an optimization of the measurement operation (path optimization).

A further subject matter of the invention is—to pick up the core idea of the inventive teaching by analogy with the previously described inventive method—an optical measurement system for determining 3D coordinates of a multiplicity of measurement points of a measurement object surface, comprising
a projector for illuminating the measurement object surface with a pattern sequence from different optical patterns,
a camera system for recording an image sequence of the measurement object surface illuminated with the pattern sequence, and
an evaluation unit for determining the 3D coordinates of the measurement points from the image sequence, in particular by determining a sequence of brightness values for identical measurement points of the measurement object surface in respective images of the recorded image sequence.

According to the invention, inertial sensors are arranged on the projector, on the camera system and/or on the measurement object in order to measure translational and/or rotational accelerations of the projector, of the camera system and/or of the measurement object. In addition—by analogy with the above-described inventive method—the evaluation unit is now designed to effect an adaptation, performed reactively as a function of the measured accelerations, in particular substantially immediately and live in terms of time during the measurement process, of the illumination, produced by the projector, of the measurement object surface and/or of the recording, performed by the camera system, of the image sequence.

The features which have already developed the inventive method above and/or have been described in more detail by way of example can likewise be applied here by analogy to the inventive optical measurement system and can therefore also be used by analogy in order to develop the inventive optical measurement system, or specify it in more detail.

BRIEF DESCRIPTION OF THE DRAWINGS

The inventive method and the inventive measurement system are described in more detail below purely by way of example with the aid of particular exemplary embodiments, represented schematically in the drawings, and there will also be a description of further advantages of the invention. Specifically:

FIGS. 9 to 11 show examples for an active real time adaptation of the pattern sequence and/or the image sequence of the running measurement process—said examples being a function of a current dynamic level, derived with the aid of the accelerations measured by the IMU, of the measuring head with integrates the projector and the camera system; and FIG. 12 shows an inventive optical measurement system being applied on a production line, there being a reaction with the aid of the measured accelerations to the vibrations that are to act on measurements with the inventive measurement system which are transmitted by an adjacent production station, and an active live adaptation of the running measurement process being performed.

DETAILED DESCRIPTION

Figure 1:
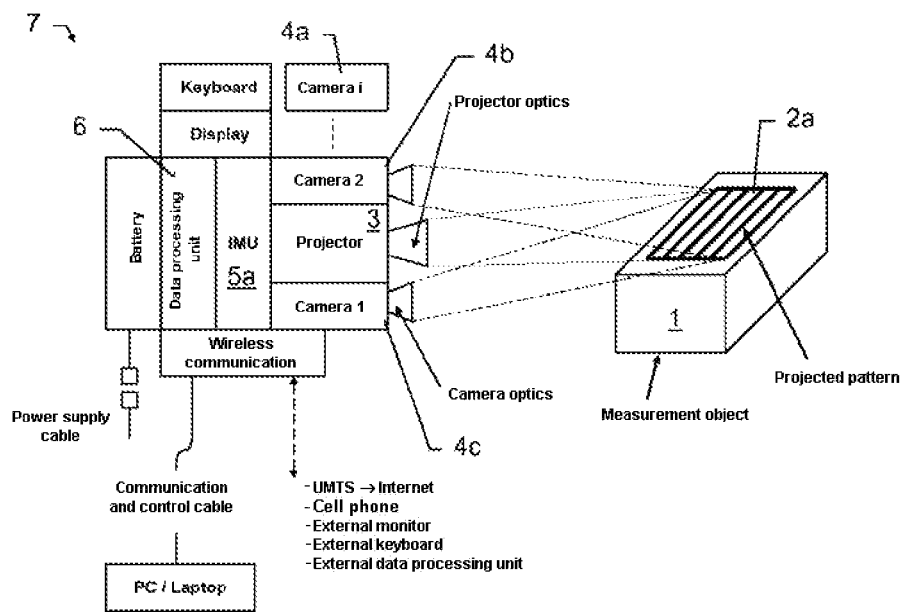
FIG. 1 shows an optical measurement system for determining 3D coordinates, according to the invention an inertial measurement unit (IMU) being integrated into the hand-held measuring head.

According to the invention, the optical measurement system 7 illustrated in FIG. 1, for determining 3D coordinates of a multiplicity of measurement points of a measurement object surface 1s has a projector 3, a camera system 4, an evaluation unit 6 and inertial sensors 5a integrated in an inertial measurement unit (IMU).

The projector 3 is designed in this case for illuminating the measurement object surface 1s with a pattern sequence of different optical patterns 2a. For example, the pattern projector 3 can be constructed in a fashion resembling the principle of a slide projector. However, it is also possible to use other projection techniques for producing the light patterns 2a, for example, programmable LCD projectors, displaceable glass supports with different grating structures in a projector, a combination of an electrically switchable grating and a mechanical displacement device, or else the projection of individual gratings on the basis of glass supports.

The camera system 4 is designed to record an image sequence of the measurement object surface 1s illuminated with the pattern sequence, and can have at least one camera, but, in particular, two, three or four cameras 4a, 4b, 4c, which, for example, can be arranged with a fixed and known positioning and orientation relative to one another, and are, specifically, designed to record individual images in a substantially simultaneous fashion.

As is known to the person skilled in the art, it is possible to make use for imaging purposes, for example, of cameras 4a, 4b, 4c with an electronic image sensor, for example, CCD or CMOS sensors which make the image information available for further processing in the form of an image matrix. Both monochrome cameras and color cameras can be used in this case.

The evaluation unit 6 is designed to determine the 3D coordinates of the measurement points from the image sequence, in particular by determining a sequence of brightness values for identical measurement points of the measurement object surface 1s in respective images of the recorded image sequence.

According to the exemplary embodiment, the projector 3 and the camera system 4 are physically accommodated with a fixed and known positioning and orientation relative to one another in a common measuring head 8 of the measurement system 7, in particular the measuring head 8 being designed to be hand-held and/or to be fitted on a robot arm.

According to the invention, the evaluation unit 6 is designed to effect an adaptation, performed reactively as a function of the measured accelerations—in particular substantially immediately and live in terms of time during the measurement process—of the illumination, produced by the projector 3, of the measurement object surface 1s and/or of the recording, performed by the camera system 4, of the image sequence.

In particular, the evaluation unit 6 is designed in this case for controlling the projector 3 and/or the camera system 4 in such a way that the illumination, produced by the projector 3, of the measurement object surface 1s and/or the recording, performed by the camera system 4, of the image sequence is adapted live as a function of a current dynamic level, derived during the measurement process with the aid of the measured accelerations, of the projector 3 and/or of the camera system 4.

In this case, the inertial sensors 5a of the inertial measurement unit can, in particular, be based on MEMS-based components and be combined, and integrated in the IMU, in such a way that said IMU is designed to measure the accelerations in all six degrees of freedom, in particular with a measurement rate of between approximately 1 and 2000 Hz, specifically between 50 and 2000 Hz.

In particular, it is possible thereby for the illustrated optical measurement system 7 to be designed and configured—as already described above—to carry out the inventive optical measurement method automatically and under pre-program control by the evaluation unit 6.

Figure 2:
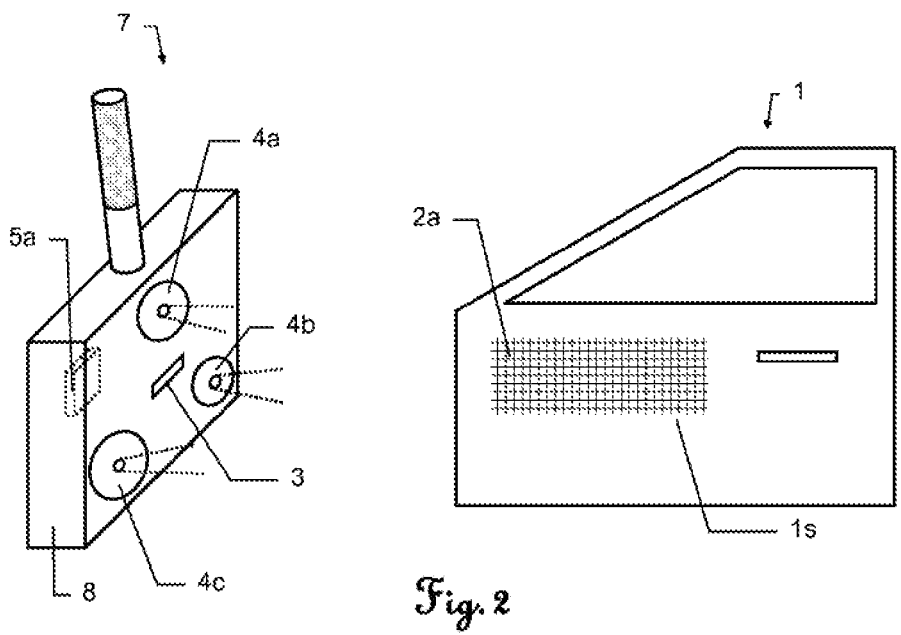
FIG. 2 shows an inventive optical measurement system with a hand-held measuring head having an IMU, projector and three cameras, a car door as measurement object being illuminated with a pattern during the 3D coordinate determination.

The exemplary embodiment, shown in FIG. 2, of an inventive optical measurement system 7 has a hand-held measuring head 8 comprising an IMU (with inertial sensors 5a), projector 3 and three cameras 4a, 4b, 4c (for example integrated in a hand-held housing with a handle, and thus designed as a light structures 3D hand scanner), a car door as measurement object 1 being illuminated with the aid of the projector 3 with a pattern 2a (as part of a pattern sequence) during the 3D coordinate determination.

The three cameras 4a, 4b, 4c of the camera system 4, which are arranged here by way of example with a fixed and known positioning and orientation relative to one another, are designed to record an image sequence of the car door surface illuminated with the pattern sequence. The cameras 4a, 4b, 4c can in this case be designed to record individual images substantially simultaneously.

In addition, an inertial measurement unit (with inertial sensors 5a) is once again integrated in the measuring head 8, as a result of which an inventive live adaptation of the current measurement process (in particular, the pattern projections or with regard to an item of user guidance information to be projected) can be performed as a function of the continuously measured accelerations (or current relative positions derived therefrom).

Figure 3:
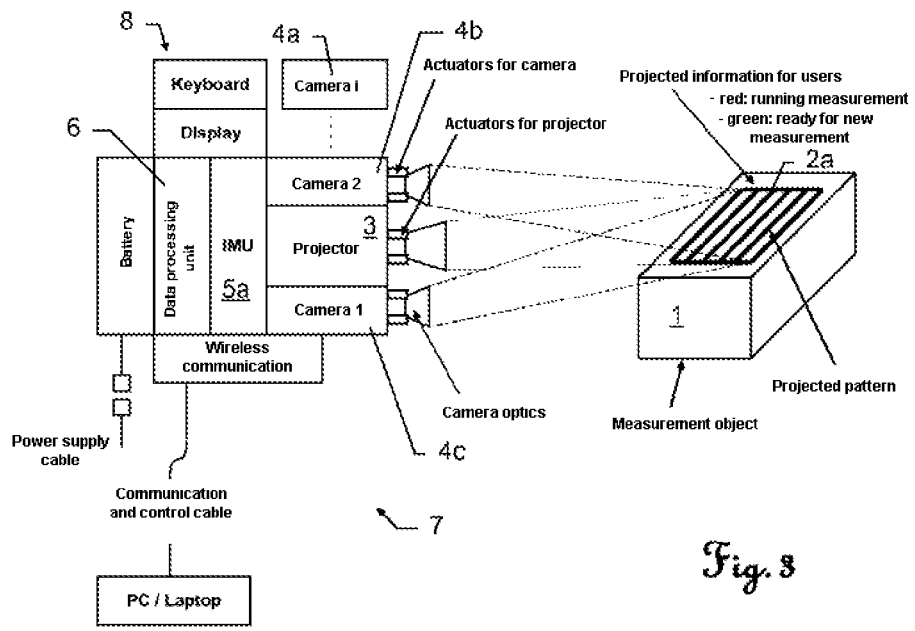
FIGS. 3 to 5 show an inventive optical measurement system with a hand-held measuring head having an IMU, projector and cameras, there being present for the projector (and/or cameras) an actuating mechanism with the aid of which the projection direction and/or position (or the recording direction and/or position) can be adapted relative to the measuring head housing as a function of the accelerations measured by the IMU, such that undesired relatively small movements of the measuring head can finally be compensated at the projector (or at the cameras)
Figure 4:
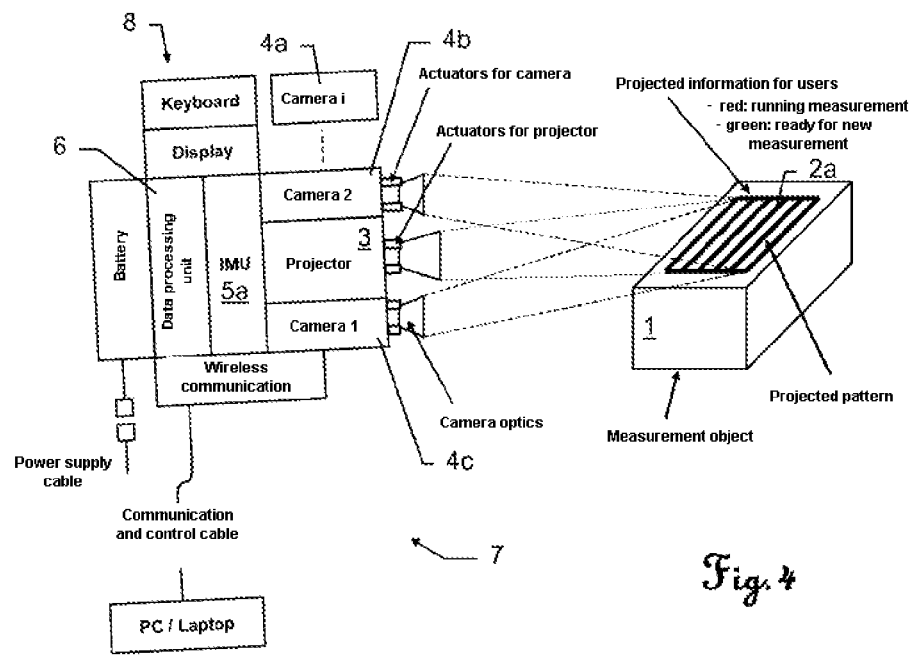
Figure 5:
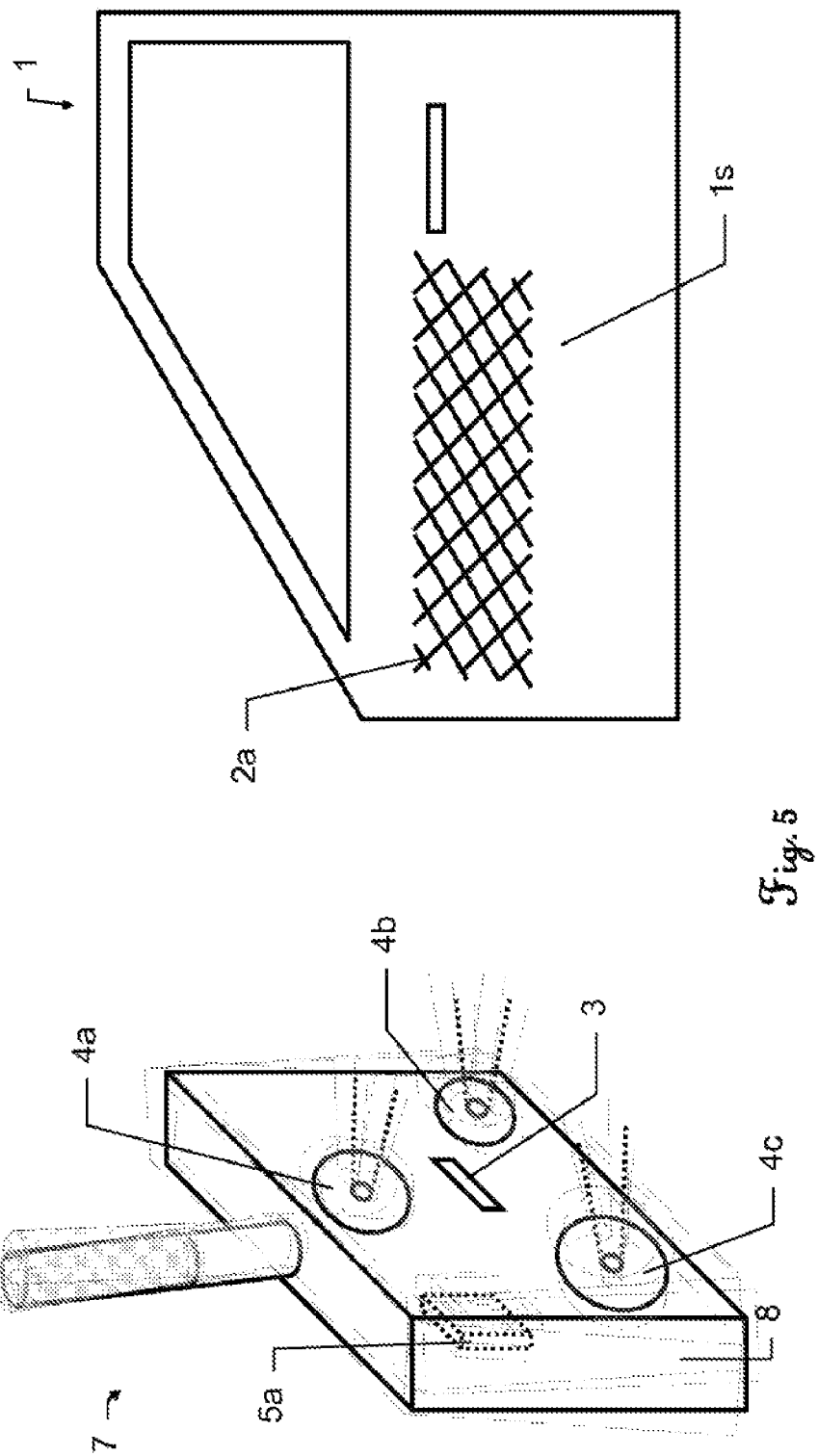

FIGS. 3 to 5 illustrate a measuring head 8 of the measurement system 7 which has an actuating mechanism (with individual actuator elements) for the projector 3 and/or cameras 4a-4c (in this case, either for the projector and the respective cameras completely, or at least for their optics), such that the projection direction and/or the projection source position of the projector 3 (and/or the camera viewing direction and/or the camera positions) are adapted relative to the housing as a function of the accelerations measured with the aid of the IMU 5a of the housing substantially in real time in such a way that housing movements—for example movements caused by unsteady holding owing to vibration or to hand tremor—are compensated, and thus the pattern 2a projected onto the measurement object surface is held substantially stable (that is to say, in a fixed position on the measurement object surface) at least during the exposure time of individual images of the image sequence in each case.

Figure 6:
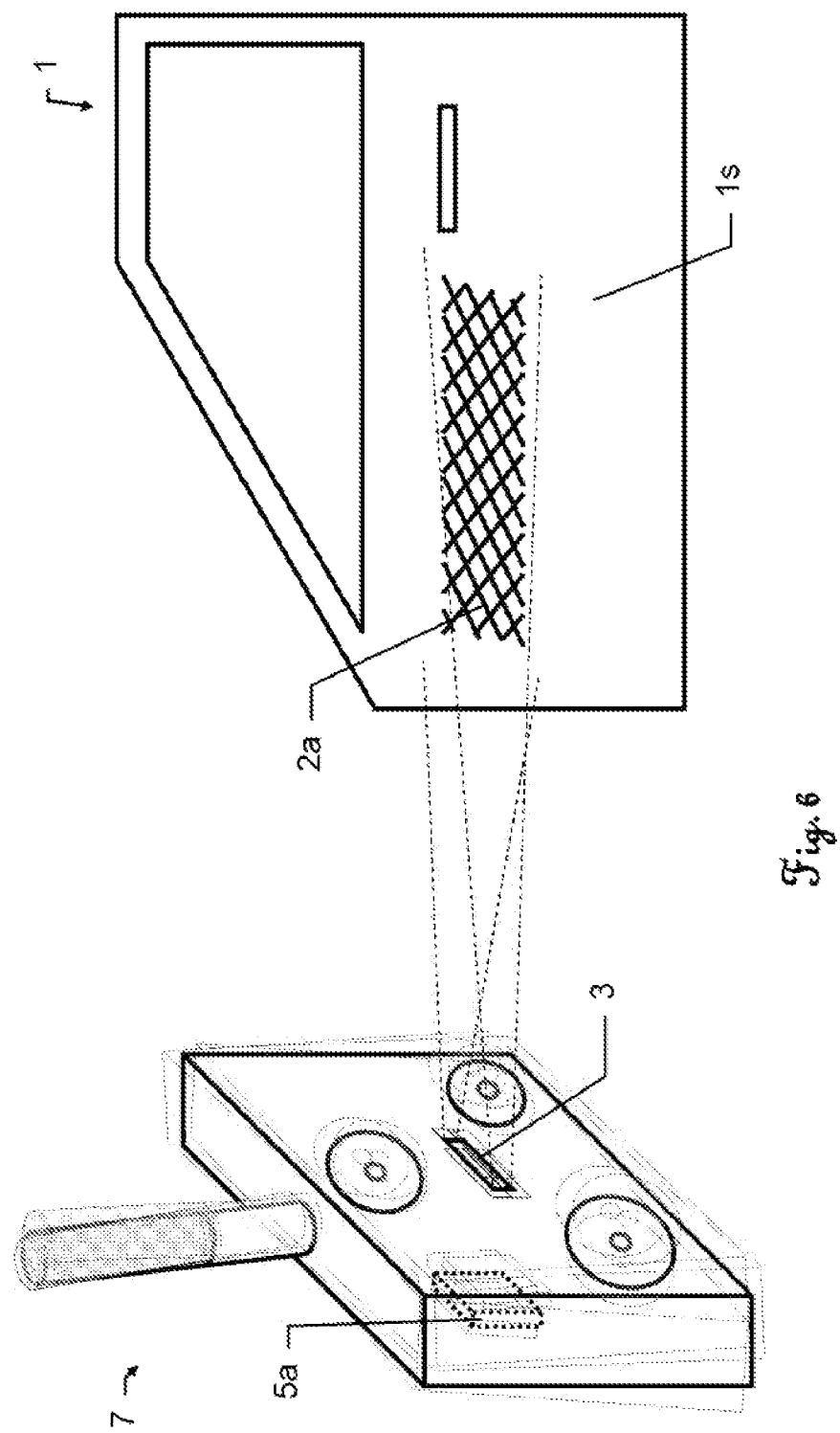
FIG. 6 shows an inventive optical measurement system, the projection (that is to say the emitted pattern) itself being adapted live in such a way that an invariable pattern with a fixed and stable position is produced despite movements by the measuring head on the measurement object surface.

As an alternative to the option, illustrated in FIGS. 3 and 4, with an actuating mechanism, FIG. 6 shows, by way of example, a measuring head 8 of the measurement system 7, in the case of which a live adaptation of the projection itself (that is to say occurring during the projection of an individual pattern of the pattern sequence) is carried out as a function of the accelerations measured with the aid of the IMU 5a in such a way that—despite movement of the measuring head—the pattern appearing on the measurement object surface (that is to say the pattern projected onto the measurement object surface) remains in a stable position on the measurement object surface (at least during the exposure time of each individual image of the image sequence).

In the case of the variant embodiment in accordance with FIG. 6, it is necessary here however—otherwise than with that in accordance with FIG. 5—to take into account the fact that the projection need not be performed in the entire possible projection aperture angle of the projector 3, since otherwise—that is to say in the case of stronger movements of the measuring head (that are caused, for example, by unsteady holding owing to hand tremors)—the patterns ultimately projected onto the measurement object surface cannot be maintained in edge regions.

Figure 7:
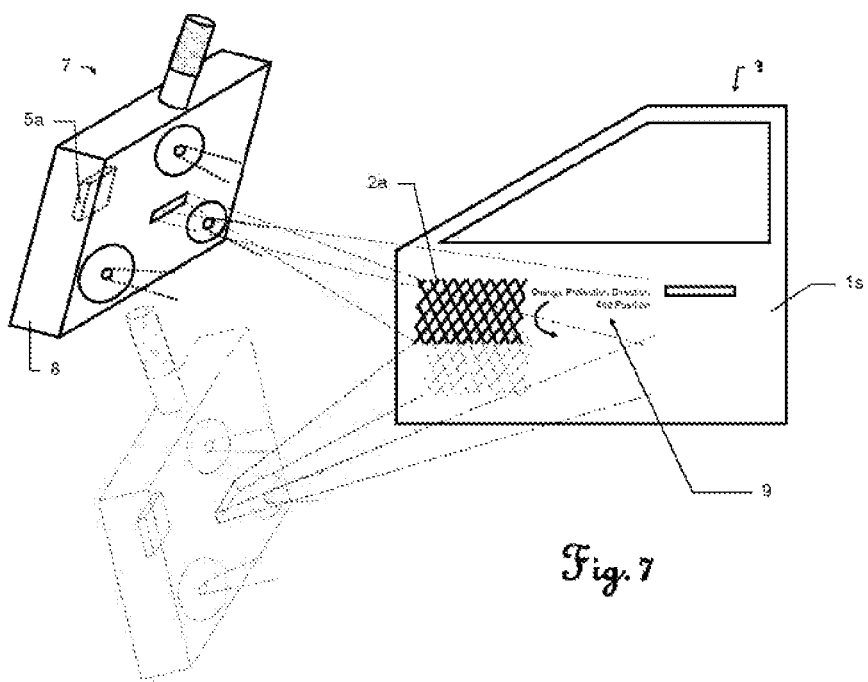
FIGS. 7 and 8 show an inventive optical measurement system with a hand-held measuring head, current measurement progress and/or measurement process adaptation parameters being derived—as a function of the output of the inertial measuring sensors—and said parameters being projected onto the measurement object surface in order to guide the user and optimize the measurement process.
Figure 8:
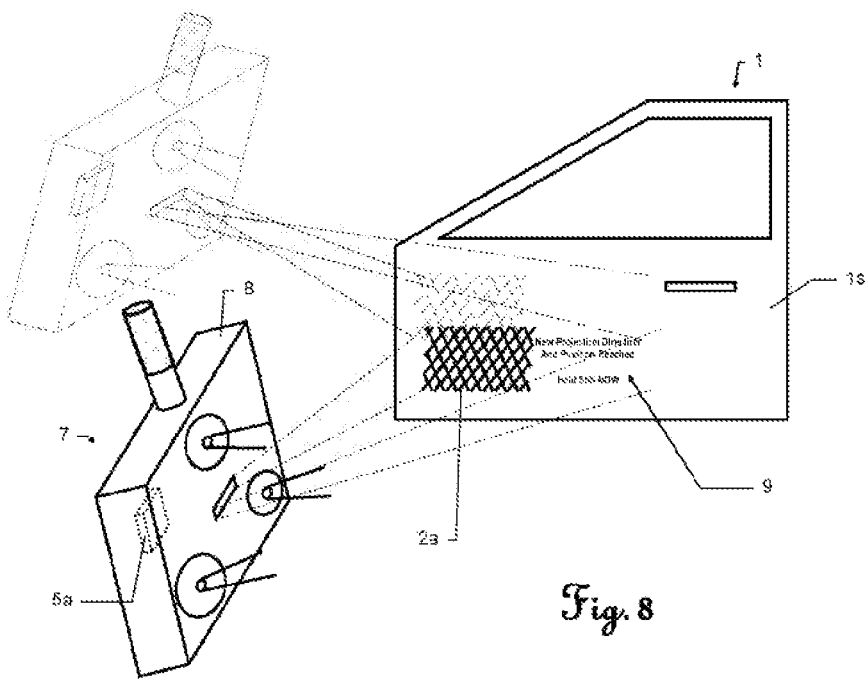

In the case of the variant embodiment in accordance with FIGS. 7 and 8, current measurement progress and/or measurement process adaptation parameters 9 are derived as a function of the accelerations measured with the aid of the IMU 5a, specifically as a function of current positions and orientations, derived therefrom, of the measuring head 8 of the measurement system 7, and, in particular, additionally as a function of at least roughly known or previously at least roughly determined 3D coordinates of the measurement object surface 1s,
and said parameters are projected onto the measurement object surface 1s for the purpose of user guidance and optimization of the measurement process.

As illustrated by way of example in FIG. 7, it is possible, in this case, for example, to project onto the measurement object surface 1s, as the measurement progress and/or measurement process adaptation parameters 9, information relating to
  a measurement direction into which the projector and/or the camera system (and/or the measuring head 8) are/is to be aligned during the further measurement process, and/or
  a measurement position which are to be adopted by the projector and/or the camera system (and/or the measuring head 8) during the further measurement process.

As shown by way of example in FIG. 8, it is also possible to project such further information as the measurement progress and/or measurement process adaptation parameters 9 onto the measurement object surface that relate, for example, to an instant from which the measuring head 8 are to be held as steady as possible in an invariable measuring direction and position.

Alternatively, it is possible, moreover, to provide as the measurement progress and/or measurement process adaptation parameters information relating, for example, to
  holding periods during which the projector and/or the camera system (and/or the measuring head) are/is to be held as steadily as possible in an invariable measurement direction and measuring position, and/or
  a current dynamic level, derived with the aid of the measured accelerations, of the projector, of the camera system (and/or of the measuring head) and/or of the measurement object (specifically, it being possible in addition to specify whether a predefined dynamic level upper limit is currently maintained or not).

Figure 9:
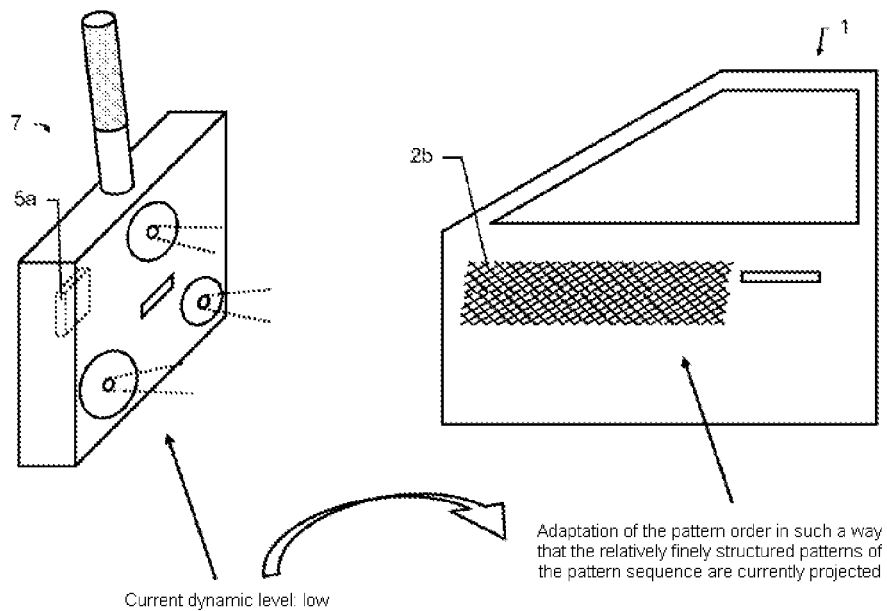
Figure 10:
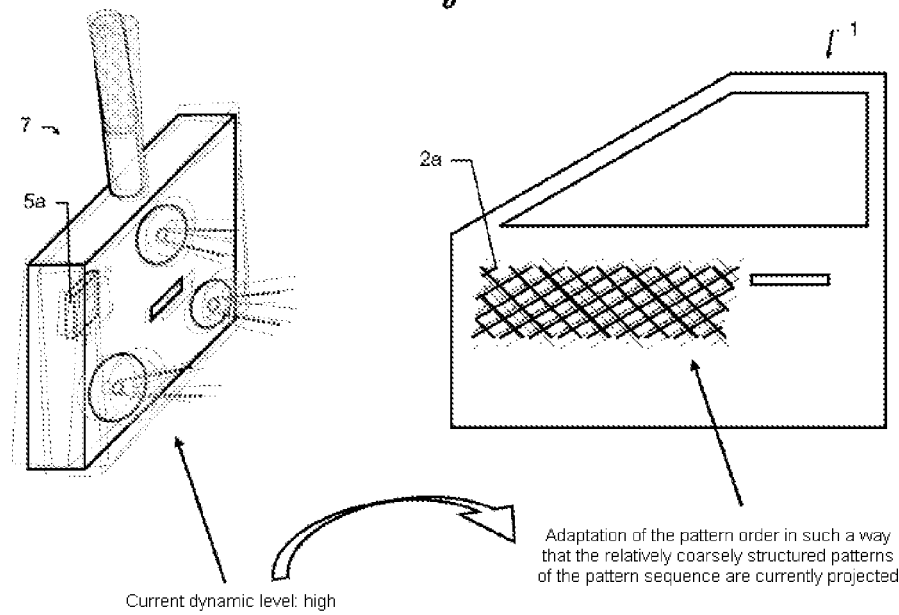

FIGS. 9 to 11 illustrate by way of example the specific inventive aspect of an adaptation—dependent on a current dynamic level, derived during the illumination with the aid of the accelerations measured by the IMU 5a, of the measuring head, which integrates the projector and the camera system, of the measurement system 7—of the pattern sequence and/or the image sequence (it frequently being necessary—as the person skilled in the art understands—to adapt the pattern sequence together and in consort with a corresponding adaptation of the image sequence in order to attain the desired effect).

The adaptation of the pattern sequence and/or the image sequence is performed in this case according to the invention substantially immediately reactively in terms of time to the derivation of the respective current dynamic level.

As may be seen in FIGS. 9 and 10, it is possible, for example, to adapt an order of the different patterns, which are to be projected consecutively, of the pattern sequence, specifically in such a way that those patterns of the pattern sequence with a relatively low degree of fineness (see FIG. 10) are projected given a relatively high current dynamic level, and those patterns of the pattern sequence with a relatively high degree of fineness (see FIG. 9) are projected given a relatively low current dynamic level.

Moreover, depending on the current dynamic level it is possible (additionally or alternatively) to take a following measures with regard to the pattern sequence, doing so substantially immediately reactively in terms of time to the derivation of the respective current dynamic level:
  adapting the brightness of the individual patterns to be projected, and/or
  adapting the projection period of the individual patterns to be projected, and/or
  adapting the projection instants of the individual patterns to be projected, and/or
  adapting the degree of fineness and/or of structuring of the individual patterns to be projected, and/or
  adapting an individual pattern of the pattern sequence in such a way during the projection of said pattern that the illumination structure thereby produced on the measurement object surface is held in a stable position on the measurement object surface—at least during the exposure time of the image of the image sequence provided for acquiring the measurement object surface (1s) illuminated with this pattern, (as already described in conjunction with FIG. 6), and/or
  adapting the area coverage and/or size of the individual patterns to be projected, and/or
  adapting the wavelength of the optical radiation used for the illumination for the individual patterns to be projected.

Either in consort with a measure for adapting the pattern sequence (the respective mutually corresponding measures, largely to be taken in combination with one another, being selfexplanatory to the person skilled in the art, and therefore being in need of no detailed explanation here), or else independently of adaptations made to the pattern sequence, the following measures with regard to the adaptation of the image sequence can, for example, likewise be taken substantially immediately reactively in terms of time to the derivation of the respective current dynamic level:
  adapting a respective degree of granulation for the individual images to be recorded, and/or
  adapting a respective exposure time for the individual images to be recorded, and/or
  adapting recording instants of the individual images to be recorded, and/or
  adapting a respective acquisition area for the individual images to be recorded, and/or
  adapting a respective aperture width for the individual images to be recorded.

Purely for the purpose of further illustrating the principle, FIG. 11 shows the particular example of a current dynamic level, continuously derived with the aid of the accelerations (measured by the IMU), for the hand-held measuring head which integrates the projector and the cameras, the current dynamic level being plotted against time in the diagram. Depending on the respective current dynamic level, in this case there is a direct adaptation, which is immediate (that is to say undertaken substantially in real time), of the illumination of the measurement object surface, and of the recording of the image sequence.

Depending on this current dynamic level, the order of the patterns of a pattern sequence which are to be projected is adapted live, for example, and, by way of example, given a currently low dynamic level, those patterns which are assigned a short projection and imaging period are "preferred" and then projected. Given a currently high dynamic level, those patterns of the pattern sequence which require a longer imaging period (on the part of the camera) and, for example, have a high fineness, are then projected onto the measurement object surface. Thus—in other words—it is possible to perform a real time adaptation of the order of the projection of the pattern sequence and the recording of the image sequence in such a way that given a currently low dynamic level those patterns of the pattern sequence which require a long exposure time for the imaging, and vice versa, are projected.

Moreover, it is also optionally possible to fix a dynamic level upper limit, in which case—to the extent said limit is overshot—the projection of further patterns of the pattern sequence and/or the recording of further images of the image sequence are/is temporarily suspended.

As long as the measuring head executes relatively strong movements, and thus currently has a high dynamic level (and overshoots the fixed dynamic level upper limit), it is possible to put the next pattern projection and imaging on hold.

It is thereby possible to prevent, or at least reduce, measurement errors caused by not having the measuring head held sufficiently steady.

FIG. 12 shows an inventive optical measurement system 7 in use on a production line, there being vibrations which are transmitted by an adjacent production station that have an effect on measurements with the aid of the inventive measurement system 7.

According to the invention, the optical measurement system 7 now has an IMU (with inertial sensors 5b) arranged on the measurement object 1. In addition to the IMU (with inertial sensors 5b) on the measurement object 1, it is also possible, in turn, for an IMU (with inertial sensors 5a) to be integrated in the measuring head 8 itself (which has two cameras here, purely by way of example). According to the invention, it is thereby now possible—as described in detail above—to react live to the movements which occur during the measurement both on the part of the measuring head 8 and also on the part of the measurement object 1 (and which are, for example, effected by vibrations transmitted onto the robot arm from the measurement environment, and by unsteadiness of the measuring head 8), and undertake reactive adaptation (substantially in real time) of the currently running measurement process.

As already explained above at various points, it is also possible in conjunction with the embodiment variant in accordance with FIG. 12 immediately to undertake, inter alia, for example, the following measures during the currently running measurement process, doing so again reactively (in particular "live") to the accelerations measured on the part of the measuring head 8 and also on the part of the measurement object 1:

adapting the order of the different patterns of the pattern sequence that are to be consecutively projected (for example in such a way that those patterns of the pattern sequence with a relatively low degree of fineness are projected given a relatively high current dynamic level, and those patterns of the pattern sequence with a relatively high degree of fineness are projected given a relatively low current dynamic level), and/or adapting the projection period of the individual patterns to be projected, and/or adapting (selecting) the projection instants of the individual patterns to be projected, and/or adapting the brightness and/or the degree of fineness and/or of structuring of the individual patterns to be projected, and/or adapting an individual pattern of the pattern sequence in such a way during the projection of said pattern that the illumination structure thereby produced on the measurement object surface is held in a stable position on the measurement object surface—at least during the exposure time of the image of the image sequence provided for acquiring the measurement object surface illuminated with this pattern, and/or adapting an area coverage and/or size on the measurement object surface of the individual patterns to be projected, and/or adapting a wavelength of the optical radiation used for the illumination for the individual patterns to be projected.

It goes without saying that these illustrated figures are only schematic representations of possible exemplary embodiments. The various approaches can likewise be combined with one another and with methods of the state of the art.

What is claimed is:

1. An optical measurement method for determining 3D coordinates of a multiplicity of measurement points of a measurement object surface, comprising the steps of:
    using a projector to illuminate the measurement object surface with a pattern sequence of different patterns;
    using a camera system to record an image sequence of measurement object surface illuminated with the pattern sequence; and
    determining the 3D coordinates of the measurement points by evaluating the image sequence of different brightness values from the different patterns for identical measurement points of the measurement object surface being determined in respective images of the recorded image sequence, wherein:
    translational or rotational accelerations of the projector, of the camera system, or of the measurement object are measured, and the illumination of the measurement object surface or the recording of the image sequence are/is reactively adapted as a function of the measured accelerations results in an adjustment of illumination of the measurement object surface or the recording of the image sequence as a function of measured accelerations.

2. The optical measurement method as claimed in claim 1, wherein translational and/or rotational accelerations of the projector, of the camera system, or of the measurement object are measured, and the illumination of the measurement object surface or the recording of the image sequence are/is reactively adapted substantially immediately and live during the measurement process in terms of time as a function of the measured accelerations.

3. The optical measurement method as claimed in claim 1, wherein accelerations of the projector, of the camera system or of the measurement object are measured in all six degrees of freedom, and the measurement of the accelerations is performed continuously at a specific measurement rate at least during the exposure times of the individual images of the image sequence.

4. The optical measurement method as claimed in claim 1, wherein accelerations of the projector, of the camera system or of the measurement object are measured in all six degrees of freedom, and the measurement of the accelerations is performed continuously at a specific measurement rate of between approximately 1 and 2000 Hz at least during the exposure times of the individual images of the image sequence.

5. The optical measurement method as claimed in claim 1, wherein accelerations of the projector, of the camera system or of the measurement object are measured in all six degrees of freedom, and the measurement of the accelerations is performed continuously at a specific measurement rate between approximately 50 and 2000 Hz during the entire process of illuminating the measurement object surface and recording the image sequence or plurality of image sequences.

6. The optical measurement method as claimed in claim 1, wherein one or more of:
   as a function of a current dynamic level of the projector, of the camera system and/or of the measurement object derived during the illumination with the aid of the measured accelerations, the pattern sequence is adapted substantially immediately reactively in terms of time to the derivation of the respective current dynamic level; or
   an order of different patterns of the pattern sequence that are to be projected consecutively is adapted in such a way that those patterns of the pattern sequence with a relatively low degree of fineness are projected given a relatively high current dynamic level, and those patterns of the pattern sequence with a relatively high degree of fineness are projected given a relatively low current dynamic level; or
   a brightness of the individual patterns to be projected is adapted; or
   a projection period of the individual patterns to be projected is adapted; or
   projection instants of the individual patterns to be projected are adapted; or
   a degree of fineness and/or of structuring of the individual patterns to be projected are/is adapted; or
   an individual pattern of the pattern sequence is adapted in such a way during the projection of said pattern that the illumination structure thereby produced on the measurement object surface is held in a stable position on the measurement object surface, at least during the exposure time of the image of the image sequence provided for acquiring the measurement object surface illuminated with this pattern; or
   an area coverage and/or size on the measurement object surface of the individual patterns to be projected are/is adapted; or
   a wavelength of the optical radiation used for the illumination for the individual patterns to be projected is adapted.

7. The optical measurement method as claimed in claim 1, wherein:
   as a function of a current dynamic level of the projector, of the camera system or of the measurement object derived during the illumination with the aid of the measured accelerations, the image sequence is adapted substantially immediately reactively in terms of time to the derivation of the respective current dynamic level.

8. The optical measurement method as claimed in claim 7, wherein:
   a respective degree of granulation for the individual images to be recorded is adapted; or
   a respective exposure time for the individual images to be recorded is adapted; or
   recording instants of the individual images to be recorded are adapted; or
   a respective acquisition area for the individual images to be recorded is adapted; or
   a respective aperture width for the individual images to be recorded is adapted.

9. The optical measurement method as claimed in claim 1, wherein:
   the projector has a housing;
   the rotational and translational accelerations of the housing are measured; and
   a projection direction and/or a projection source position of the projector are/is adapted relative to the housing substantially in real time and as a function of the measured accelerations of the housing in such a way that movements of the housing are compensated, and thus the projection direction or the projection source position of the projector are/is substantially kept constant.

10. The optical measurement method as claimed in claim 1, wherein:
    the projector has a measuring head housing that jointly integrates the projector and the camera system;
    the rotational and translational accelerations of the housing are measured; and
    a projection direction or a projection source position of the projector are/is adapted relative to the housing substantially in real time and as a function of the measured accelerations of the housing in such a way that movements caused by unsteady holding owing to vibration or to hand tremor are compensated, and thus the projection direction or the projection source position of the projector are/is substantially kept constant at least during the recording of individual images of the image sequence in each case.

11. The optical measurement method as claimed in claim 1, wherein:
    the camera system with at least one camera has a housing;
    the rotational and translational accelerations of the housing are measured; and
    an acquisition direction or a recording position of the at least one camera of the camera system are/is adapted relative to the housing substantially in real time and as a function of the measured accelerations of the housing in such a way that movements of the housing of the housing are compensated, and thus the acquisition direction or the recording position of the at least one camera of the camera system are/is substantially kept constant.

12. The optical measurement method as claimed in claim 1, wherein:
    the camera system with at least one camera has a measuring head housing that jointly integrates the projector and the camera system;
    the rotational and translational accelerations of the housing are measured; and
    an acquisition direction or a recording position of the at least one camera of the camera system are/is adapted relative to the housing substantially in real time and as a function of the measured accelerations of the housing in such a way that movements caused by unsteady holding owing to vibration or to hand tremor of the housing are compensated, and thus the acquisition direction or the recording position of the at least one camera of the camera system are/is substantially kept constant at least during the recording of individual images of the image sequence in each case.

13. The optical measurement method as claimed in claim 1, wherein:
    as a function of the measured accelerations derived from said accelerations, of the projector, of the camera system or of the measurement object;
    current measurement progress or measurement process adaptation parameters are derived and said parameters are projected onto the measurement object surface to guide the user and optimize the measurement process.

14. The optical measurement method as claimed in claim 1, wherein:

as a function of the measured accelerations, specifically as a function of current positions and orientations, derived from said accelerations, of the projector, of the camera system and/or of the measurement object;
as well as a function of at least roughly known or previously at least roughly determined 3D coordinates of the measurement object surface;
current measurement progress or measurement process adaptation parameters are derived and said parameters are projected onto the measurement object surface to guide the user and optimize the measurement process, information relating to:
a measurement direction in which the projector or the camera system are/is to be aligned during the further measurement process; or
a measurement position which are to be adopted by the projector and/or the camera system during the further measurement process; or
holding periods during which the projector and/or the camera system are/is to be held as steadily as possible in an invariable measurement direction and measuring position; or
a current dynamic level, derived with the aid of the measured accelerations, of the projector, of the camera system and/or of the measurement object being specified whether a predefined dynamic level upper limit is currently maintained or not,
being projected as the measurement progress or measurement process adaptation parameters.

15. The optical measurement method as claimed in claim 1, wherein:
the 3D coordinates of the measurement points are determined photogrammetrically from the recorded image sequence by using the triangulation principle and with knowledge of the pattern of the pattern sequence, acquired in the respective images of the image sequence by means of forward section; or
positions known relative to one another are illuminated and recorded from and with the aid of alignments known relative to one another, the recording being performed from different positions using a plurality of cameras as parts of the camera system.

16. The optical measurement method as claimed in claim 1, wherein the measurement object surface is illuminated consecutively with stripe patterns of different degrees of fineness, pseudo codes or random patterns as the different patterns of the pattern sequence.

17. The optical measurement method as claimed in claim 16, wherein the illumination being performed consecutively with the individual patterns with a projection period of approximately between 10 and 300 ms and the recording of the image sequence being performed with an exposure time per image of approximately between 10 and 300 ms in each case.

18. An optical measurement system for determining 3D coordinates for a multiplicity of measurement points of a measurement object surface, comprising:
a projector for illuminating the measurement object surface with a pattern sequence from different optical patterns;
a camera system for recording an image sequence of the measurement object surface illuminated with the pattern sequence; and
an evaluation unit for determining the 3D coordinates of the measurement points from the image sequence by determining a sequence of different brightness values from the different patterns for identical measurement points of the measurement object surface in respective images of the recorded image sequence, wherein:
inertial sensors are arranged on the projector, on the camera system, or on the measurement object in order to measure translational or rotational accelerations of the projector, of the camera system and/or of the measurement object, and
the evaluation unit is designed to effect an adaptation, performed reactively as a function of the measured accelerations that results in an adjustment of illumination of the measurement object surface or the recording of the image sequence as a function of measured accelerations.

19. The optical measurement system as claimed in claim 18, wherein the evaluation unit is designed to effect an adaptation, performed reactively as a function of the measured accelerations substantially immediately and live in terms of time during the measurement process, of the illumination, produced by the projector, of the measurement object surface or of the recording, performed by the camera system, of the image sequence.

20. The optical measurement system as claimed in claim 18, wherein:
the evaluation unit is designed to control the projector or the camera system in such a way that the illumination, produced by the projector, of the measurement object surface, or the recording, performed by the camera system, of the image sequence is adapted live as a function of a current dynamic level, derived during the measurement process with the aid of the measured accelerations, of the projector or of the camera system, or
the inertial sensors are combined and integrated in an inertial measurement unit based on MEMS-based components in such a way that the inertial measurement unit is designed to measure the accelerations in all six degrees of freedom with a measurement rate of between approximately 1 and 2000 Hz, specifically between approximately 50 and 2000 Hz.

21. The optical measurement system as claimed in claim 18, wherein:
the projector has a housing;
the inertial sensors being arranged on the housing and thus being designed to measure the rotational and translational accelerations of the housing; and
a projector actuating mechanism is present in order to change a projection direction or a projection source position for the projector relative to the housing, which projector actuating mechanism can be driven by the evaluation unit such that the projection direction and/or the projection source position of the projector are/is adapted relative to the housing as a function of the measured accelerations of the housing substantially in real time in such a way that movements of the housing are compensated, and thus the projection direction or the projection source position of the projector are/is substantially kept constant.

22. The optical measurement system as claimed in claim 18, wherein:
the projector and the camera system are accommodated physically in both fixed and known positioning and orientation relative to one another in a common measuring head and the measuring head having a measuring head housing jointly integrating the projector and the camera system;

the inertial sensors are arranged on the housing and thus being designed to measure the rotational and translational accelerations of the housing; and a projector actuating mechanism constructed from MEMS-based actuator components or piezoactuator elements is present in order to change a projection direction or a projection source position for the projector relative to the housing, which projector actuating mechanism can be driven by the evaluation unit such that the projection direction or the projection source position of the projector are/is adapted relative to the housing as a function of the measured accelerations of the housing substantially in real time in such a way that movements of the housing and movements caused by unsteady holding owing to vibration or to hand tremor are compensated, and thus the projection direction or the projection source position of the projector are/is substantially kept constant, at least during the recording of individual images of the image sequence in each case.

23. The optical measurement system as claimed in claim 18, wherein:

the camera system with at least one camera has a housing, the projector and the camera system being accommodated physically in both fixed and known positioning and orientation relative to one another in a common measuring head and the measuring head having a measuring head housing jointly integrating the projector and the camera system;

the inertial sensors are arranged on the housing and thus being designed to measure the rotational and translational accelerations of the housing; and a camera actuating mechanism constructed from MEMS-based actuator components or piezoactuator elements is present in order to change an acquisition direction or a recording position of the at least one camera of the camera system relative to the housing, which camera actuating mechanism can be driven by the evaluation unit such that the acquisition direction or the recording position of the at least one camera of the camera system are/is adapted relative to the housing as a function of the measured accelerations of the housing substantially in real time in such a way that movements of the housing caused by unsteady holding owing to vibration or to hand tremor are compensated, and thus the acquisition direction or the recording position of the at least one camera are/is substantially kept constant, at least during the recording of individual images of the image sequence in each case.

24. The optical measurement system as claimed in claim 18, wherein the evaluation unit is designed to derive current measurement progress or measurement process adaptation parameters as a function of the measured accelerations as a function of current positions and orientations, derived from said accelerations, of the projector, of the camera system or of the measurement object.

25. The optical measurement system as claimed in claim 24, wherein:

additionally as a function of at least roughly known or previously at least roughly determined 3D coordinates of the measurement object surface; and the projector is designed and configured in such a way, as well as being able to be driven by the evaluation unit, in such a way that information with respect to the derived current measurement progress or measurement process adaptation parameters are projected onto the measurement object surface to guide users and optimize the measurement process.

26. The optical measurement system as claimed in claim 24, wherein information relating to:

a measurement direction in which the projector or the camera system are/is to be aligned during the further measurement process; or a measurement position which are to be adopted by the projector and/or the camera system during the further measurement process; or holding periods during which the projector and/or the camera system are/is to be held as steadily as possible in an invariable measurement direction and measuring position; or a current dynamic level, derived with the aid of the measured accelerations, of the projector, of the camera system or of the measurement object, it being specified whether a predefined dynamic level upper limit is currently maintained or not being projected as the measurement progress or measurement process adaptation parameters.

\* \* \* \* \*